United States Patent
Kwak et al.

(10) Patent No.: US 9,670,710 B2
(45) Date of Patent: Jun. 6, 2017

(54) OVER SLAM BUMPER FOR VEHICLE

(71) Applicants: Hyundai Motor Company, Seoul (KR); Kia Motors Corporation, Seoul (KR)

(72) Inventors: Dae Hoon Kwak, Gyeonggi-do (KR); Yong Hyun Nam, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/922,527

(22) Filed: Oct. 26, 2015

(65) Prior Publication Data
US 2017/0016262 A1 Jan. 19, 2017

(30) Foreign Application Priority Data
Jul. 14, 2015 (KR) .................. 10-2015-0099877

(51) Int. Cl.
E05F 5/02 (2006.01)
F16F 15/08 (2006.01)

(52) U.S. Cl.
CPC .............. *E05F 5/022* (2013.01); *F16F 15/08* (2013.01); *E05Y 2900/531* (2013.01); *E05Y 2900/536* (2013.01); *E05Y 2900/548* (2013.01); *Y10T 16/61* (2015.01); *Y10T 16/628* (2015.01); *Y10T 16/6285* (2015.01)

(58) Field of Classification Search
CPC ... E05F 5/02; E05F 5/022; E05F 5/025; E05F 5/06; F16F 15/08; F16F 15/085; Y10T 16/628; Y10T 16/6285; Y10T 16/61
See application file for complete search history.

(56) References Cited

U.S. PATENT DOCUMENTS 6,857,166 B2 * 2/2005 Nakagaki .............. E05F 5/022
16/86 R
8,984,715 B2 * 3/2015 Kaji ...................... E05F 5/022
16/86 R
(Continued)

FOREIGN PATENT DOCUMENTS

JP H11201123 A 7/1999
JP 2002-349524 A 12/2002
(Continued)

*Primary Examiner* — Jeffrey O Brien
(74) *Attorney, Agent, or Firm* — Mintz Levin Cohn Ferris Glovsky and Popeo, P.C.; Peter F. Corless (57) ABSTRACT

An over slam bumper for a vehicle is provided and includes a buffer unit having one end protruding from an inner panel of the door toward a vehicle body and absorbing shock power between the vehicle body and the door. A mounting unit has one end fixed to another end of the buffer unit and another end thereof is inserted into a penetration aperture to fix the buffer unit to the inner panel. The mounting unit includes an insert flange inserted into the buffer unit and a support flange interconnected to the insert flange. An insert having one end integrally protrudes from a center of the support flange toward the penetration aperture and clips are integrally formed at the protruding end of the insert and are fixed while being locked to an inner circumferential surface of the penetration aperture when a predetermined portion thereof is inserted into the penetration aperture.

11 Claims, 4 Drawing Sheets

(56) References Cited

U.S. PATENT DOCUMENTS

| | | | |
|---|---|---|---|
| 2003/0088940 A1* | 5/2003 | Nakagaki | E05F 5/022 16/86 R |
| 2005/0145767 A1* | 7/2005 | Nakagaki | E05F 5/022 248/345.1 |
| 2012/0246896 A1* | 10/2012 | Kaji | E05F 5/022 24/682.1 |

FOREIGN PATENT DOCUMENTS

| | | |
|---|---|---|
| JP | 2003-148535 A | 5/2003 |
| JP | 2003-202043 A | 7/2003 |
| JP | 3640425 B2 | 4/2005 |
| KR | 2008-0030225 A | 4/2008 |
| KR | 10-2012-0029936 A | 3/2012 |

* cited by examiner

OVER SLAM BUMPER FOR VEHICLE

CROSS-REFERENCE TO RELATED APPLICATION

This application claims priority to and the benefit of Korean Patent Application No. 10-2015-0099877 filed in the Korean Intellectual Property Office on Jul. 14, 2015, the entire contents of which are incorporated herein by reference.

BACKGROUND (a) Field of the Invention

The present invention relates to an over slam bumper for a vehicle, and more particularly, to an over slam bumper for a vehicle mounted in an inner panel of a door to absorb a shock that occurs between the door and a vehicle body when the door mounted in the vehicle body is opened and closed or while the vehicle is being driven.

(b) Description of the Related Art

In general, a hood, a door tail gate, and a door of a vehicle have a structure in which each end thereof is hinged to a vehicle body and the vehicle components rotate based on the hinged end to be opened from the vehicle body. The vehicle body opening portion is disposed in the hood, the door tail gate, and the door with the over slam bumper to perform a damping function when the door is closed, thereby alleviating a shock and reducing noise occurrence. In other words, the over slam bumper alleviates the shock during the opening and closing of a moving part to prevent parts from being damaged and form an appropriate reaction force between the vehicle body and the moving part to prevent a joint while driving.

Among the existing over slam bumpers, an over slam bumper for a vehicle applied to the door is mounted within a penetration aperture formed at an inner panel of the door disposed at the vehicle body between the vehicle body and the door. The over slam bumper includes a buffer unit that protrudes to the exterior of the inner panel to alleviate the shock and a mounting unit inserted into the penetration aperture, in which a locking groove is formed between the mounting unit inserted into the penetration aperture and the buffer unit to allow the inner panel to be inserted into the locking groove.

Particularly, the mounting unit has an inclined cone shape in which a diameter is increased from one end directing to the door to the other end directing to a protruding part and is mounted within the penetration aperture by a press-fit scheme to prevent it from being separated from the penetration aperture by inserting the inner panel into the locking groove while the mounting unit is inserted into the penetration aperture.

The existing over slam bumper configured as described above has predetermined elasticity and is made of a rubber material to absorb a shock while elastically deformed when it is engaged between the vehicle body and the inner panel when the door is closed. Therefore, the over slam bumper is elastically deformed between it and the vehicle body when the door is closed to absorb the shock occurring between the door and the vehicle body and prevent the vehicle body from being damaged.

However, the existing over slam bumper for a vehicle configured as described above is made entirely of the rubber material and therefore may be permanently deformed due to the frequency elastic deformation and abrasion occurrence when it is used for a substantial period of time. In particular, when the mounting unit is deformed and worn, the over slam bumper may be easily separated from the penetration aperture by the external shock force when passengers contact the over slam bumper while entering and exiting the vehicle or the door is opened.

Further, when the over slam bumper made of the rubber material is mounted within the penetration aperture, the mounting unit is forcibly pressed and fitted to be inserted into the penetration aperture, such that workability may deteriorate. When the abrasion and the deformation of the over slam bumper increase, the over slam bumper forms a gap without contacting between the vehicle body and the door. In addition, when the vehicle is being driven on an unpaved road or a road having an uneven surface, the shaking of the door may not be prevented and after a predetermined time has elapsed, the over slam bumper requires replacement, such that marketability of the vehicle may deteriorate.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide an over slam bumper for a vehicle which is mounted in an inner panel of a door to absorb shock power occurring between the door and a vehicle body due to vibrations transferred from a road surface when the door mounted in the vehicle body is opened and closed or while the vehicle is being driven, thereby reducing a damping function and noise occurrence, preventing the over slam bumper from being separated from the inner panel even when the over slam bumper is used for a substantial period of time, and improving mounting workability and support performance.

An exemplary embodiment of the present invention provides an over slam bumper for a vehicle that may include: a buffer unit having one end (e.g., a first end) protruding from an inner panel of a door toward a vehicle body and configured to absorb shock power occurring between the vehicle body and the door; and a mounting unit having one end (e.g., a first end) fixedly mounted to the other end of the buffer unit (e.g., a second end) and the other end (e.g., a second end) inserted into a penetration aperture to fix the buffer unit to the inner panel, in which the mounting unit may include: an insert flange inserted into the buffer unit; a support flange interconnected to the insert flange at a position spaced apart from the insert flange at a predetermined interval to form a locking groove between the support flange and the insert flange and supporting the other end of the buffer unit inserted into the locking groove; an insert having one end integrally protruding from a center of the support flange toward the penetration aperture; and at least two clips integrally formed at the protruding one end of the insert and fixed while being locked to an inner circumferential surface of the penetration aperture when a predetermined portion thereof is inserted into the penetration aperture.

The inside of buffer unit may include an insertion groove that encloses an outer circumference of the insert flange and the other end may have a mounting aperture connected to the insertion groove. The buffer unit may have the other end (e.g., second end) integrally provided with protruding ends contacting the inner panel while the protruding ends integrally protrude toward the inner panel along a circumference of an outer circumferential surface.

Further, the support flange may have an outer circumferential end partially inserted into the protruding end and may include at least one support protrusion that protrudes or extends from an inside of the protruding end toward the inner panel. The support protrusions may be each formed at a position spaced apart from each other at a set angle along a circumference of the support flange based on a center of the insert.

The clip may be formed to be inclined in a cone shape in which the other end directing to the support flange from one end connected to the insert directs to an outer side from a center of the insert. The clip may have the other end (e.g., second end) that may include a support groove supporting the inner panel when the clip is locked by being inserted into an inner circumferential surface of the penetration aperture. The clips may be spaced apart from each other at a set angle along a circumference of the insert and may be formed in pair at a position at which the clips face each other and the other one of the clips is disposed between the pair.

A position facing the other one of the clips may have the other end integrally connected to the insert to prevent elastic deformation and may include a holder having the support groove. The support flange may have a cross shape. The buffer unit and the mounting unit may be made of different materials. Additionally, the buffer unit may be made of a thermo plastic elastomer (TPE) material. The mounting unit may be made of a poly oxy methylene (POM) material and may be molded by injection molding.

BRIEF DESCRIPTION OF THE DRAWINGS

The objects, features and advantages of the present invention will be more apparent from the following detailed description in conjunction with the accompanying drawings, in which.

DESCRIPTION OF SYMBOLS

10: Inner panel
12: Penetration aperture
20: Vehicle body
100: Over slam bumper
110: Buffer unit
112: Insertion groove
114: Mounting aperture
116: Protruding end
120: Mounting unit
121: Insert flange
122: Locking groove
123: Support flange
124: Support protrusion
125: Insert
126: Clip
127: Support groove

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. Since exemplary embodiments stated in the present specification and configurations shown in the accompanying drawings are only exemplary embodiments of the present invention and do not represent the spirit of the present invention. Therefore, it is to be understood that various equivalents and modifications that may replace exemplary embodiments stated in the present specification and configurations shown in the accompanying drawings may be provided in a point in time at which the present invention is filed.

Portions unrelated to the description will be omitted in order to obviously describe the present invention, and similar components will be denoted by the same reference numerals throughout the present specification. Since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions. The terms "~unit", "~means", "~part", "member", etc., described in the specification mean units of a comprehensive configuration for performing at least one function and operation.

Figure 1:
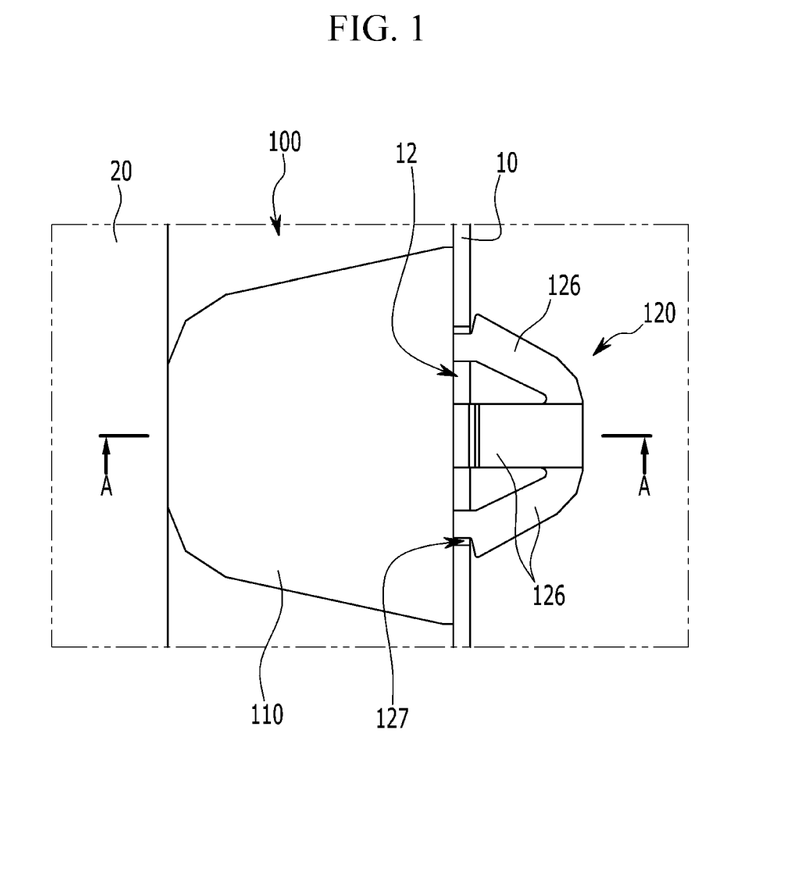
FIG. 1 is a diagram of an over slam bumper for a vehicle according to an exemplary embodiment of the present invention.
Figure 2:
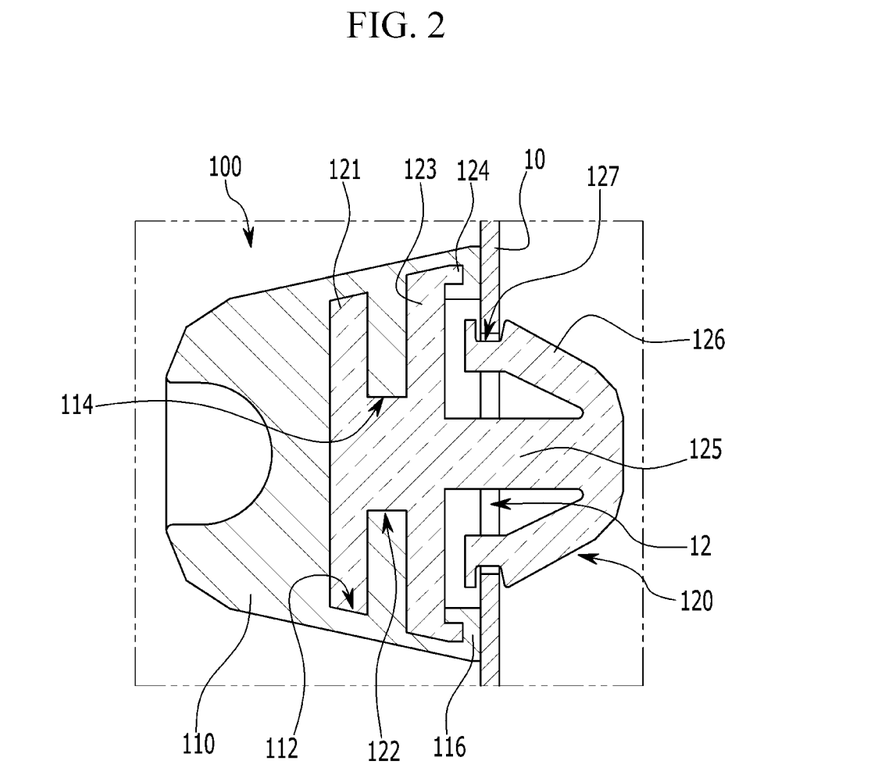
FIG. 2 is a cross-sectional view taken along line A-A of FIG. 1 according to an exemplary embodiment of the present invention.
Figure 3:
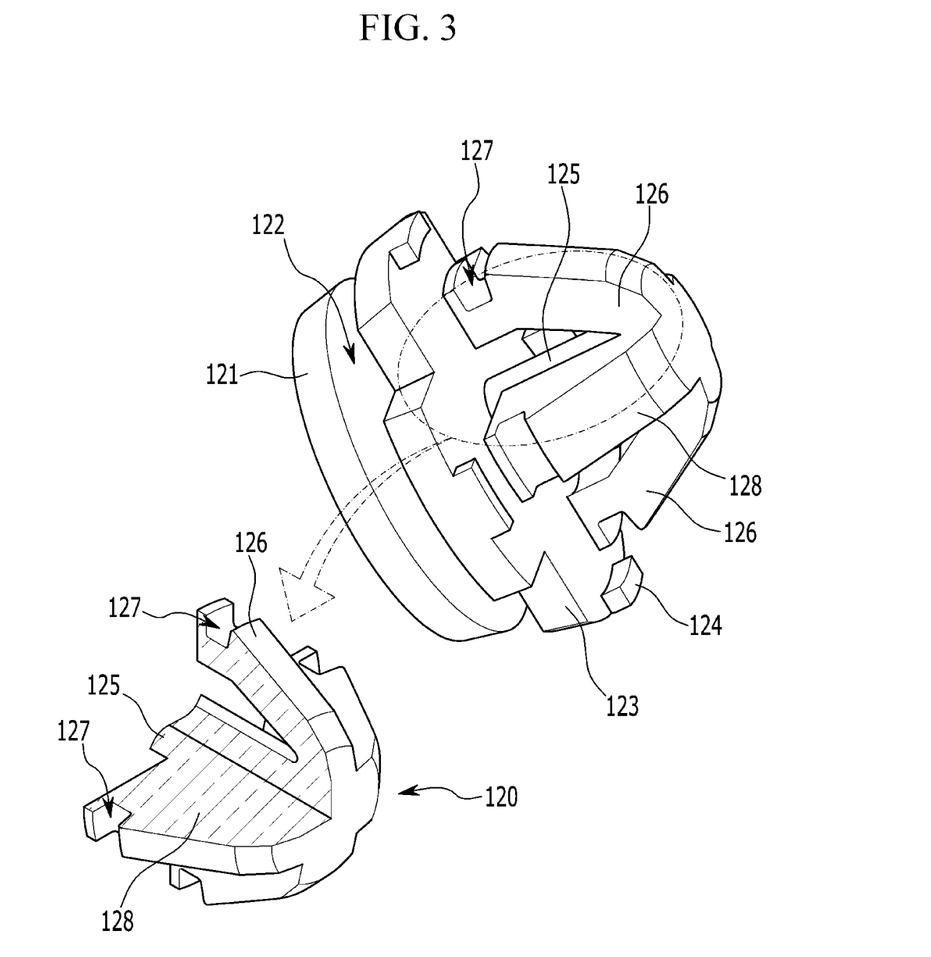
FIG. 3 is a view of a mounting unit applied to the over slam bumper for a vehicle according to the exemplary embodiment of the present invention.

FIG. 1 is a diagram of an over slam bumper for a vehicle according to an exemplary embodiment of the present invention, FIG. 2 is a cross-sectional view taken along the line A-A of FIG. 1, and FIG. 3 is a view of a mounting unit applied to the over slam bumper for a vehicle according to the exemplary embodiment of the present invention.

Referring to the accompanying drawings, an over slam bumper 100 for a vehicle according to an exemplary embodiment of the present invention, is mounted to a penetration aperture 12 formed at an inner panel 10 of a door to absorb shock power occurring between the inner panel 10 of the door and a vehicle body 20 when the opened door is closed or while a vehicle is being driven.

As illustrated in FIGS. 1 and 2, the over slam bumper 100 may include a buffer unit 110 and a mounting unit 120. First, the buffer unit 110 may have one end (e.g., a first end) that protrudes from the inner panel 10 toward the vehicle body 20 and may be configured to absorb the shock power occurring between the vehicle body 20 and the door.

The buffer unit 110 may have a cone shape inclined from one end contacting the vehicle body 20 toward the other end supported to the inner panel 20 and may be made of a material different than that of the mounting unit 120. In particular, the buffer unit 110 may be made of a thermo plastic elastomer (TPE) material, which is a thermoplastic elastic body, having all properties of rubber and plastic but having more hardness than the rubber and more flexibility than the plastic. Further, the mounting unit 120 may have one end (e.g., a first end) fixedly mounted at the other end (e.g., a second end) of the buffer unit 110 and the other end (e.g., a second end) inserted into the penetration aperture 12 to fix the buffer unit 110 to the inner panel 10.

As illustrated in FIGS. 2 and 3, the mounting unit 120 may include an insert flange 121, a support flange 123, an insert 125, and a clip 126. First, the insert flange 121 may have a disk shape and may be inserted into the buffer unit 110. The support flange 123 may be interconnected to the insert flange 121 at a position spaced apart from the insert flange 121 to form a locking groove 122 between it and the insert flange 121 and may support the other end (e.g., the second end) of the buffer unit 110 inserted into the locking groove 122. The support flange 123 may have a cross shape but is not limited thereto. Therefore, the support flange 123 may also have a polygonal shape that includes a circular shape.

The insert 125 may have one end (e.g., a first end) that integrally protrudes from a center of the support flange 123 at an opposite side of the insertion flange 121 toward the penetration aperture 12. In particular, an inside of the buffer unit 110 may include an insertion groove 112 that encloses an outer circumference of the insert flange 121 and the buffer unit may also include a mounting aperture 114 connected to the insertion groove 112. A diameter of the mounting aperture 114 may be less than that of the insertion groove 112. Therefore, the insert flange 121 may be inserted into the mounting aperture 114 of the buffer unit 110 by a press-fit scheme and the buffer unit 110 positioned at an outer side of the mounting aperture 114 may be inserted into the locking groove 122 so that the support flange 123 supports the other end (e.g., the second end) of the buffer unit 110.

Meanwhile, according to the present exemplary embodiment, the buffer unit 110 may have the other end (e.g., second end) integrally formed with protruding ends 116 which are formed in a ring shape having a predetermined thickness along a circumference of an outer circumferential surface and directly contacts the inner panel 10 while the protruding ends 116 integrally protrude toward the inner panel 10. Further, the support flange 123 may have an outer circumferential end partially inserted into the protruding end 116 and may include at least one support protrusion 124 that protrudes from an inside of the protruding end 116 toward the inner panel 10.

The support protrusions 124 may each be formed at a position spaced from each other at a set angle along a circumference of the support flange 123 based on the center of the insert 125 and according to the present exemplary embodiment, four support protrusions 124 may be formed while being spaced from each other at an angle of about 90°, corresponding to the support flange 123 formed in a cross shape. The support protrusion 124 may be configured to stably support the protruding end 116 that contacts (e.g., abuts) the inner panel 10 to alleviate a load transferred from the inner panel 10 to the protruding end 116 and prevent a rotation separation and a permanent deformation of the buffer unit 100.

Further, the clip 126 may be configured in at least a pair to be integrally formed at a protruding end of the insert 125 and may be fixed to be locked to an inner circumferential surface of the penetration aperture 12 while partially inserted into the penetration aperture 12. In particular, the clip 126 may be formed to be inclined in a cone shape in which the other end directing to the support flange 123 from one end connected to the insert 125 directs to an outer side from a center of the insert 125.

In addition, the clip 126 may have with a second end that includes a support groove 127 supporting the inner panel 10 when inserted into an inner circumferential surface of the penetration aperture 12 and locked thereto. The clip 126 configured as described above may have an elastic force and may be formed at the insert 125 in at least two to face each other and according to the present exemplary embodiment, the clip 126 may be formed as a pair at a position facing each other while being spaced apart from each other at a set angle along the circumference of the insert 125 and another clip 126 may be disposed between the pair (e.g., teaching three clips, a third clip disposed between a first and a second clip). Further, a position facing the other one of the clips 126 may have the second end integrally connected to the insert 125 and may include a holder 128 having the support groove 127.

After the holder 128 is mounted in the penetration aperture 12 along with the clips 126, the holder 128 increases a removal force of the mounting unit 120 to prevent the over slam bumper 100 mounted within the penetration aperture 12 from being separated. In other words, the clips 126 and the holder 128 may each be formed to face each other at a position spaced from each other at an angle of about 90° along the circumference of the insert 125.

When the clips 126 configured as described above are inserted into the penetration aperture 12, the second end may be elastically deformed toward the insert 125 to be inserted into the penetration aperture 12. In particular, the holder 128 may have a second end integrally connected to the insert 125 and thus may be inserted into the penetration aperture 127 when the elastic deformation is prevented. In this state, when the clips 126 and the holder 128 are continued to be inserted into the penetration aperture 12 to position the penetration aperture 12 in each of the support grooves 127, the second ends of the three clips 126 elastically deformed may be recovered to an initial position toward the inner circumferential surface of the penetration aperture 12, and thus the fixing to the penetration aperture 12 of the inner panel 10 may be completed.

Meanwhile, the present exemplary embodiment describes that a pair of clips disposed at a position at which the clips 126 face each other and the another clip 126 and the holder 128 disposed between the pair of clips 126 may be formed in four while each being spaced apart from each other at an angle of about 90°, but is not limited thereto and therefore the position and the number of clips 126 and holders 128 may be changed.

Figure 4:
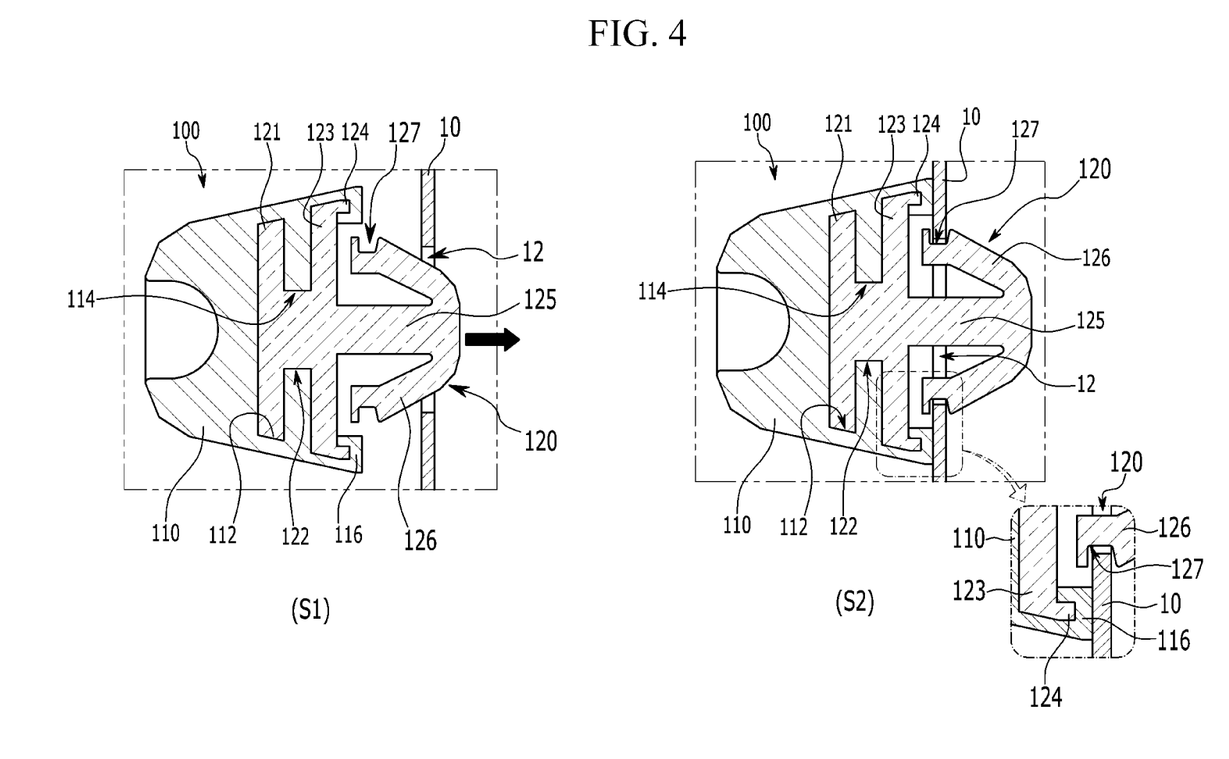
FIG. 4 is a diagram illustrating stepwise a mounting state of the over slam bumper for a vehicle according to the exemplary embodiment of the present invention.

The mounting unit 120 configured as described above may be made of a poly oxy methylene (POM) and may be molded by an injection molding. The POM material is a crystalline thermoplastic resin having excellent mechanical rigidity, thermal characteristics, and moldability and is engineering plastic having excellent fatigue resistance, robustness, and wear resistance. Hereinafter, a mounting process and an action of the over slam bumper for a vehicle according to the exemplary embodiment of the present invention configured as described above will be described in detail with reference to FIG. 4. FIG. 4 is a diagram illustrating stepwise a mounting state of the over slam bumper for a vehicle according to the exemplary embodiment of the present invention.

First, the insert flange 121 of the mounting unit 120 manufactured by the injection molding may be inserted into the insertion groove 112 through the mounting aperture 114 of the buffer unit 110 by press fitting to assemble the buffer unit 110 and the mounting unit 120 with each other. When the assembly of the buffer unit 110 with the mounting unit 120 is completed, a second end of the buffer unit 110 may be inserted into the locking groove 122 as the insert flange 121 is inserted into the insertion groove 112, thereby allowing the support flange 123 to support the second end of the buffer unit 110. The support protrusions 124 may be inserted into the protruding end 116 of the buffer unit 110.

Further, as in S1 of FIG. 4, the over slam bumper 100 may be inserted into the penetration aperture 12 when each clip 126 is positioned in the penetration aperture 12. In addition, three clips 126 may be inserted into the penetration aperture 12 along with the holder 128 while the second end is elastically deformed toward the insert 125. In particular, when the over slam bumper 100 is continued to be inserted into the penetration aperture 12 to position the support groove 127 on the inner circumferential surface of the penetration aperture 12, as in S2 of FIG. 4, the support grooves 127 may be inserted into the inner circumferential surface of the penetration aperture 12 while the three clips 126 may be recovered to the initial position by the elastic force.

Particularly, when the clips 126 other than the holder 128 are recovered to the initial position, it may be confirmed that the over slam bumper 100 is mounted in the inner panel 10 through a contact joint occurring while the support groove 127 is inserted into the inner circumferential surface of the penetration aperture 12. In other words, a worker may confirm that the mounting is completed by the occurrence of a contact joint, without directly confirming whether the mounting of the over slam bumper 100 is completed with the naked eyes, thus decreasing the working time.

Meanwhile, as the support protrusions 124 support the protruding end 16 while protruding from the inside of the protruding end 116 to contact the inner panel 10 toward the inner panel 10, the support protrusions 124 may suppress the flow of the buffer unit 110 due to the external shock force, thereby preventing the rotation separation and the permanent deformation of the buffer unit 10. In the over slam bumper 100 mounted in the inner panel 10 by the process as described above, the support groove 127 into which the inner circumferential surface of the penetration aperture 12 is inserted may support the inner panel 10 to bear a predetermined amount of load transferred from the inner panel 10 due to the external shock force, etc.

Furthermore, the support groove 127 bears a predetermined amount of load transferred from the inner panel 10, to transfer the load to the buffer unit 100 in the alleviated state. Therefore, the fatigue scale of the buffer unit 110 may deteriorate due to the load and the durability may be improved. When the over slam bumper 100 for a vehicle according to the exemplary embodiment of the present invention configured as described above is applied, the over slam bumper 100 may be mounted in the inner panel 10 of the door to absorb the shock power occurring between the door and the vehicle body 20 due to vibrations transferred from a road surface when the door mounted in the vehicle body 20 is opened and closed or while the vehicle is being driven, thereby reducing the damping function and the noise occurrence, preventing the over slam bumper 100 from being separated from the inner panel 10 even when the over slam bumper is used for a substantial period of time, and improving the mounting workability and the support performance.

In addition, the buffer unit 110 and the mounting unit 120 may be made of different materials and the buffer unit 110 may be replaced during the abrasion of the buffer unit 110 made of the TPE material to save the replacement costs. Accordingly, it may be possible to prevent the over slam bumper 100 from being separated from the penetration aperture 12 due to the contact of passengers with the over slam bumper 100 while entering or exiting the vehicle or the external shock power when the door is opened.

Further, the support groove 127 inserted into the inner circumferential surface of the penetration aperture 12 to support the inner panel 10 and the support protrusion 124 for preventing the flow of the buffer unit 110 contacting the inner panel 10 may be integrally formed in the mounting unit 120 to alleviate the load applied from the inner panel 10 to the buffer unit 110 and may prevent the rotation separation and the permanent deformation of the buffer unit, thereby improving the overall durability.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An over slam bumper for a vehicle, comprising:
   a buffer unit having a first end that protrudes from an inner panel of a door toward a vehicle body and is configured to absorb shock power that occurs between the vehicle body and the door; and
   a mounting unit having a first end fixedly mounted to a second end of the buffer unit and a second end inserted into a penetration aperture to fix the buffer unit to the inner panel,
   wherein the mounting unit includes:
   an insert flange inserted into the buffer unit;
   a support flange interconnected to the insert flange at a position spaced apart from the insert flange at a predetermined interval to form a locking groove between the support flange and the insert flange and configured to support the second end of the buffer unit inserted into the locking groove;
   an insert having a first end integrally protruding from a center of the support flange toward the penetration aperture; and
   at least two clips integrally formed at the first end of the insert and fixed while being locked to an inner circumferential surface of the penetration aperture when a predetermined portion thereof is inserted into the penetration aperture, wherein each clip is formed to be inclined in a cone shape in which a second end directed toward the support flange from a first end connected to the insert faces an outer side from a center of the insert, the second end of each clip is spaced apart and detached from the insert, the clips are spaced apart from each other at a set angle along a circumference of the insert and are formed in at least a pair facing each other, in which an additional clip is disposed between the pair of clips, and the additional clip has both the first end and the second end integrally and directly connected to the insert to prevent elastic deformation and includes a holder having a support groove.

2. The over slam bumper for a vehicle of claim 1, wherein the buffer unit has an inside that includes an insertion groove enclosing an outer circumference of the insert flange and the second end of the buffer unit includes a mounting aperture connected to the insertion groove.

3. The over slam bumper for a vehicle of claim 1, wherein the second end of the buffer unit is integrally provided with protruding ends that contact the inner panel while the protruding ends integrally protrude toward the inner panel along a circumference of an outer circumferential surface.

4. The over slam bumper for a vehicle of claim 3, wherein the support flange has an outer circumferential end partially inserted into the protruding end and includes support protrusion that protrudes from an inside of the protruding end toward the inner panel.

5. The over slam bumper for a vehicle of claim 4, wherein the support protrusions are each formed at a position spaced apart from each other at a set angle along a circumference of the support flange based on a center of the insert.

6. The over slam buffer for a vehicle of claim 1, wherein the second end of each clip includes a support groove that supports the inner panel when the clip is locked by being inserted into an inner circumferential surface of the penetration aperture.

7. The over slam buffer for a vehicle of claim 1, wherein the support flange has a cross shape.

8. The over slam buffer for a vehicle of claim 1, wherein the buffer unit and the mounting unit are made of different materials.

9. The over slam buffer for a vehicle of claim 1, wherein the buffer unit is made of a thermo plastic elastomer (TPE) material.

10. The over slam buffer for a vehicle of claim 1, wherein the mounting unit is made of a poly oxy methylene (POM) material and is molded by injection molding.

11. The over slam buffer for a vehicle of claim 6, wherein each support groove bears a predetermined amount of load transferred from the inner panel to transfer the load to the buffer unit in an alleviated state.

* * * * *